No. 757,267. PATENTED APR. 12, 1904.
A. W. CASE.
PRESSURE BLOWER.
APPLICATION FILED FEB. 13, 1903.
NO MODEL.

Witnesses:
Ethel M. Lowe.
Ernest A. Thurman

Inventor,
Alfred Wells Case
by Harry R. Williams
atty.

No. 757,267. Patented April 12, 1904.

UNITED STATES PATENT OFFICE.

ALFRED WELLS CASE, OF HIGHLAND PARK, CONNECTICUT.

PRESSURE-BLOWER.

SPECIFICATION forming part of Letters Patent No. 757,267, dated April 12, 1904.

Application filed February 13, 1903. Serial No. 143,243. (No model.)

*To all whom it may concern:*

Be it known that I, ALFRED WELLS CASE, a citizen of the United States, residing at Highland Park, in the county of Hartford and State of Connecticut, have invented certain new and useful Improvements in Pressure-Blowers, of which the following is a specification.

This invention relates to a blower which has fan-blades so inclosed that when in operation air will be thrown off from the localities where the pressure is the greatest and prevented from eddying back to the localities where the pressure is less.

The object of the invention is the production of a blower which is simple and cheap to construct, which can be operated with comparatively little power, and which will cause the flow of a large volume of air under considerable pressure.

When the common blower is in operation, there is more pressure just in front of each blade than there is just behind each blade, due to the motion of the blades, and if the air in the system is under some pressure the tendency is for the air in front of each blade to flow around to the back of each blade—that is, from a locality of greater pressure to a locality of less pressure—instead of flowing through the outlet into the piping of the system. With the present construction the air is only allowed to escape from the localities where it is under the greater pressure and is prevented from returning to the localities where there is less pressure.

The blower that is illustrated as embodying the invention has a suitably-supported spiral shell with central inlet and tangential outlet. The fan-blades are mounted on a shaft borne by bearings held by brackets that are secured to the sides of the shell and are almost entirely inclosed between two annular plates which are only open at the center to provide for the inflow of air and a peripheral plate which only has an opening through it just in front of each blade to provide for the outflow of air from in front of each blade and prevent the return of air behind each blade.

Figure 1:
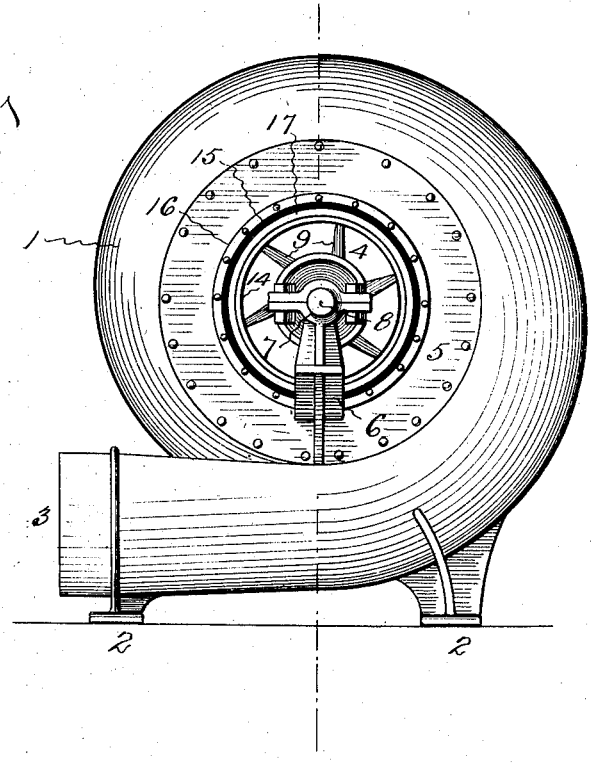
Figure 2:
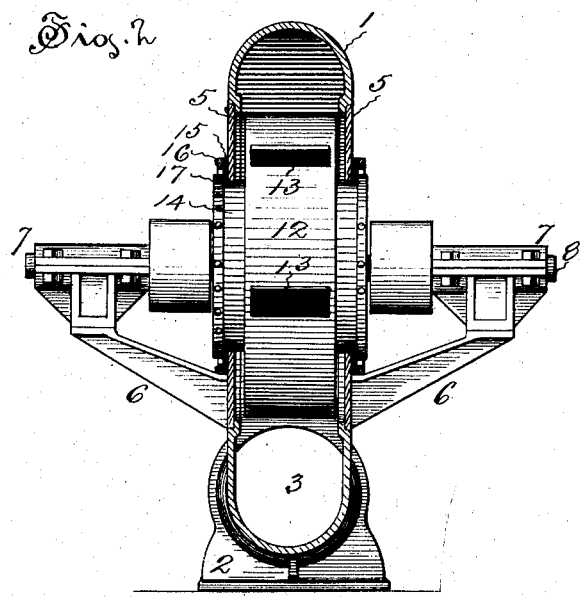
Figure 3:
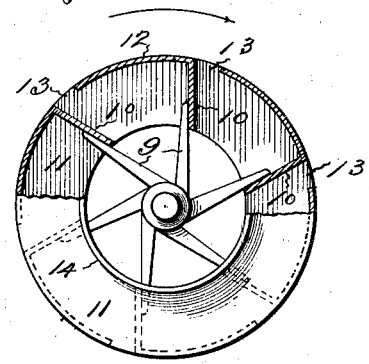

Figure 1 of the accompanying drawings shows a side elevation of a blower that embodies the invention. Fig. 2 shows an edge elevation of the blower with the shell cut in central vertical section. Fig. 3 shows a side elevation of the rotatory part of the blower with a portion of one of the side plates broken away, so as to show the fan-blades and the peripheral plate with the openings in front of each blade.

The shell 1 is formed of thin metal in a spiral form in a common manner. This shell is supported by feet 2 and has an outlet 3 at the bottom and an inlet 4 through each side. Extending outwardly from each of the side plates 5 of the shell is a bracket 6, supporting bearings 7, which hold a shaft 8. Projecting from the shaft are a number of arms 9, to each of which a fan-blade 10 is secured. Each side of the fan-blades and secured so as to rotate with them is an annular plate 11. Around the periphery of the blades and the annular plates is a plate 12. This peripheral plate is provided with a number of small openings 13, one being just in front of each of the blades. A tube 14 is secured to the fan-blade arms, so as to project outwardly through the opening of the annular plate on each side. On the side wall of the shell about each tube an annular packing 15, of leather or other suitable material, is placed. This is preferably held in position by a ring 16, which is screwed or riveted to the side wall of the shell about the outer edge of the packing. Upon each tube outside of the leather a collar 17 is attached. These parts are so arranged that any tendency toward an outward flow of air from the casing around the tubes when the machine is in operation causes the packings to press against the collar and form a tight joint, and thus prevent leakage.

This construction is very simple. The air close in front of each fan-blade when the machine is in operation is thrown off through the opening in the peripheral plate and cannot return back of the blade, where there is always more or less tendency to a vacuum created by the forward movement of the blade. All counter circulation from in front of a fan-blade around to the back of the same blade or any eddying circulation behind the back of the blade next in front—that is, from a locality where the air-pressure is greater to a locality where the air-pressure is less—is prevented by the peripheral plate which covers the opening back of each blade where the pressure is less. With this construction the air is directed outwardly off from each blade from the locality where it is under the greatest pressure and of necessity has to be driven out through the outlet, for the openings are so small through the peripheral plate that it cannot return between the plates.

I claim as my invention—

A pressure-blower consisting of a spiral shell that is circular in cross-section and has a tangential outlet, an annular plate secured to each side of the spiral shell, an upwardly-extending arm secured to the lower part of each annular plate, bearings supported by the arms, a shaft held by the bearings, a fan located within the shell and supported by the shaft, the said fan consisting of radial arms, fan-blades fastened to the arms, an annular plate supported by the arms each side of the blades, a peripheral plate encircling the blades and side plates and having a relatively small opening immediately in front of each blade, tubes extending outwardly from the side plates of the fan through the annular plates fastened to the sides of the shell, a packing secured to each side plate of the shell about a tube, and a collar on each tube outside of each packing, substantially as specified.

ALFRED WELLS CASE.

Witnesses:
HARRY R. WILLIAMS,
ETHEL M. LOWE.